(12) United States Patent
Kunimoto

(10) Patent No.: US 10,963,137 B2
(45) Date of Patent: Mar. 30, 2021

(54) INFORMATION DISPLAY APPARATUS AND NON-TRANSITORY RECORDING MEDIUM STORING PROGRAM FOR CONTROLLING INFORMATION DISPLAY APPARATUS

(71) Applicant: BROTHER KOGYO KABUSHIKI KAISHA, Nagoya (JP)

(72) Inventor: Shintaro Kunimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 15/427,640

(22) Filed: Feb. 8, 2017

(65) Prior Publication Data

US 2017/0285831 A1    Oct. 5, 2017

(30) Foreign Application Priority Data

Mar. 30, 2016    (JP) .............................. JP2016-068600

(51) Int. Cl.
*G06F 3/0484* (2013.01)
*G06F 3/0481* (2013.01)
(Continued)

(52) U.S. Cl.
CPC ........ *G06F 3/04842* (2013.01); *G06F 3/0414* (2013.01); *G06F 3/04812* (2013.01); *G06F 3/04845* (2013.01); *G06F 2203/04803* (2013.01)

(58) Field of Classification Search
CPC .... G06F 3/0412; G06F 3/0414; G06F 3/0416; G06F 3/0488–04886; G06F 3/04812;
(Continued)

(56) References Cited

U.S. PATENT DOCUMENTS 8,209,628 B1 *    6/2012   Davidson .............. G06F 3/0487
                                                                     715/790
2012/0030570 A1*    2/2012   Migos ................. G06F 3/04883
                                                                     715/702
(Continued)

FOREIGN PATENT DOCUMENTS

CN          102576282 A      7/2012
JP       2000-293280 A     10/2000
(Continued)

OTHER PUBLICATIONS

Notice of Reasons for Rejection dated Nov. 19, 2019 in Japanese Patent Application No. 2016-068600, together with a partial English translation.
(Continued)

*Primary Examiner* — David Tung
(74) *Attorney, Agent, or Firm* — Scully, Scott, Murphy & Presser, PC

(57) ABSTRACT

There is provided a non-transitory recording medium storing a program that causes an information display apparatus to execute: accepting input under a pressure in a first range on a screen; accepting input under a pressure in a second range stronger than the pressure in the first range on the screen; determining, from among objects displayed in a predefined position on the screen in an overlapped manner, an object having a highest display order as an operation target object, when the input under the pressure in the first range is accepted in the predefined position; and change a display order configuration for the objects to a first configuration when the input under the pressure in the second range is accepted on the screen after the determination of the operation target object.

19 Claims, 11 Drawing Sheets

(51) Int. Cl.
*G06F 3/041* (2006.01)
*G06F 3/0488* (2013.01)

(58) Field of Classification Search
CPC . G06F 3/04817; G06F 3/04842; G06F 3/0482
See application file for complete search history.

(56) References Cited

U.S. PATENT DOCUMENTS

2012/0044259 A1* 2/2012 Carlhian ............ G06F 3/04815
　　　　　　　　　　　　　　　　　　　　345/629
2012/0147052 A1* 6/2012 Homma .................. G06F 3/044
　　　　　　　　　　　　　　　　　　　　345/660
2013/0298014 A1* 11/2013 Kodimer ............ H04N 1/00411
　　　　　　　　　　　　　　　　　　　　715/251

FOREIGN PATENT DOCUMENTS

JP　　　2006-293878 A　　10/2006
JP　　　2014-006695 A　　1/2014

OTHER PUBLICATIONS

Notification of First Office Action dated Jan. 26, 2021 received from the Chinese Patent Office in related application CN 201710069254.2 together with English language translation.

* cited by examiner

Fig. 4B PEEK

Fig. 4C PINCH-IN

Fig. 4D POP

Fig. 6A
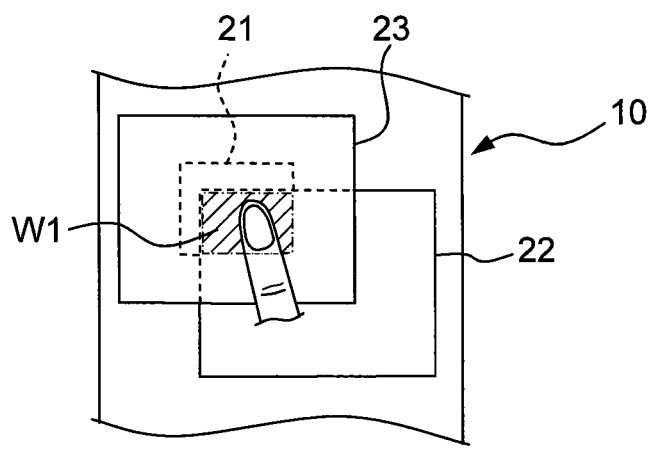
Fig. 6B
PEEK
POP
Fig. 6C
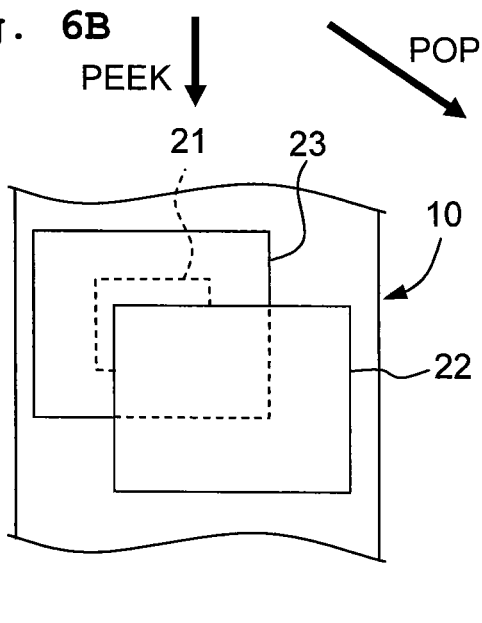
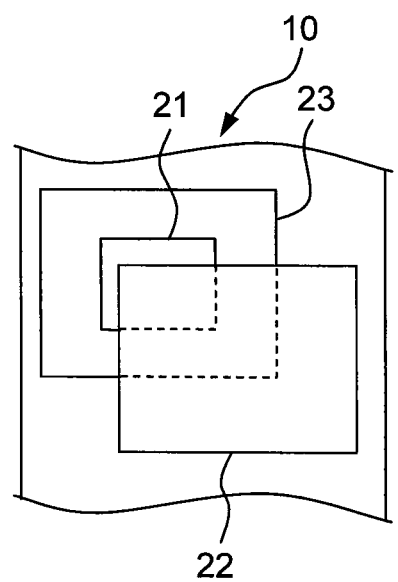

INFORMATION DISPLAY APPARATUS AND NON-TRANSITORY RECORDING MEDIUM STORING PROGRAM FOR CONTROLLING INFORMATION DISPLAY APPARATUS

CROSS REFERENCE TO RELATED APPLICATION

The present application claims priority from Japanese Patent Application No. 2016-068600 filed on Mar. 30, 2016, the disclosure of which is incorporated herein by reference in its entirety.

BACKGROUND

Field of the Invention

The present teaching relates to an information display apparatus and a non-transitory recording medium storing a program for controlling the information display apparatus. The present teaching more particularly relates to technology, for an information display apparatus including an input function and configured to display objects on a screen in an overlapped manner, which changes an order of display of the objects. In the following explanation, the words of "an order of display of the objects" are referred to as "a display order (of the objects)" for simplicity.

Description of the Related Art

In conventional information display apparatuses including a screen with an input function, such as tablets and touch panels, objects may be arranged on the screen freely and the objects may be displayed on the screen in an overlapped manner. There is also known technology for differentiating kinds of input operations on the screen of the information display apparatus, such as a tap, flick, and pinch.

There is known literature disclosing technology of an information display apparatus that displays objects on a screen in an overlapped manner. For example, the following technology is publicly known. That is, an information input apparatus includes pointing devices on a front surface and a back surface, and objects displayed on respective screens are moved based on coordinate positions and motion vectors detected by the two pointing devices.

SUMMARY

In the above conventional information display apparatuses, when a user selects, from among the objects displayed on the screen, an object that has a low display order and is hidden by an object having a high display order, the user, for example, may finish the object of which display order is higher than that of the selection target object or move the object having the high display order to a position where the selection target object is not hidden thereby. Those operations, unfortunately, may cause any inconvenience to the user.

The present teaching is made to solve the problems of the above conventional technology. Namely, an object of the present teaching is to provide new technology, for an information display apparatus that displays objects on a screen in an overlapped manner, which changes a display order configuration for the objects easily.

According to an aspect of the present teaching, there is provided a non-transitory recording medium storing a program which is to be executed on an information display apparatus including a screen having an input function, wherein the program causes the information display apparatus to execute:

displaying a plurality of objects in a predefined position on the screen in an overlapped manner;

accepting input under a pressure in a first range on the screen;

accepting input under a pressure in a second range stronger than the pressure in the first range on the screen;

determining, from among the objects displayed in the predefined position on the screen in the overlapped manner, an object having a highest display order as an operation target object, in a case that the input under the pressure in the first range is accepted in the predefined position; and changing a display order configuration for the objects to a first configuration in a case that the input under the pressure in the second range is accepted on the screen after the determination of the operation target object.

The program disclosed in the present specification makes the apparatus that displays objects on the screen in the overlapped manner and accepts the input under different pressure ranges, perform processing for differentiating input pressures in different ranges on the screen and changing the display order configuration for the objects depending on the pressure range of the accepted input. More specifically, when the input under the pressure in the first range is accepted, the program makes the apparatus determine the object having the highest display order as the operation target object. When the input under the pressure in the second range is accepted, the program makes the apparatus change the display order configuration for the objects to the first configuration. When input under a pressure in a third range is accepted, the program makes the apparatus change the display order configuration for the objects to a second configuration.

Namely, the program disclosed in the present specification makes the apparatus that displays objects on the screen in the overlapped manner, change the display order configuration for the objects depending on the pressure range of the accepted input. Thus, a user may obtain a desired display order configuration for the objects by changing input strength, and thus the user may select any object easily. Accordingly, the user may easily change the display order configuration for the objects in the information display apparatus that displays objects on the screen in the overlapped manner.

A control method for achieving functions of the program as well as a computer readable recording medium storing the program are novel and useful.

The present teaching provides new technology, for an information display apparatus that displays objects on a screen in an overlapped manner, which easily changes a display order configuration for objects.

BRIEF DESCRIPTION OF THE DRAWINGS

FIGS. 4A to 4D are illustration diagrams depicting an example in which a selection program changes a display of objects.

FIGS. 6A to 6C are illustration diagrams depicting an example in which a movement program changes a display of objects.

DESCRIPTION OF THE EMBODIMENTS

In the following, an embodiment in which an information display apparatus according to the present teaching is embodied will be explained in detail with reference to the accompanying drawings. In the embodiment, the present teaching is applied to an information display application program built in a mobile device.

Figure 1:
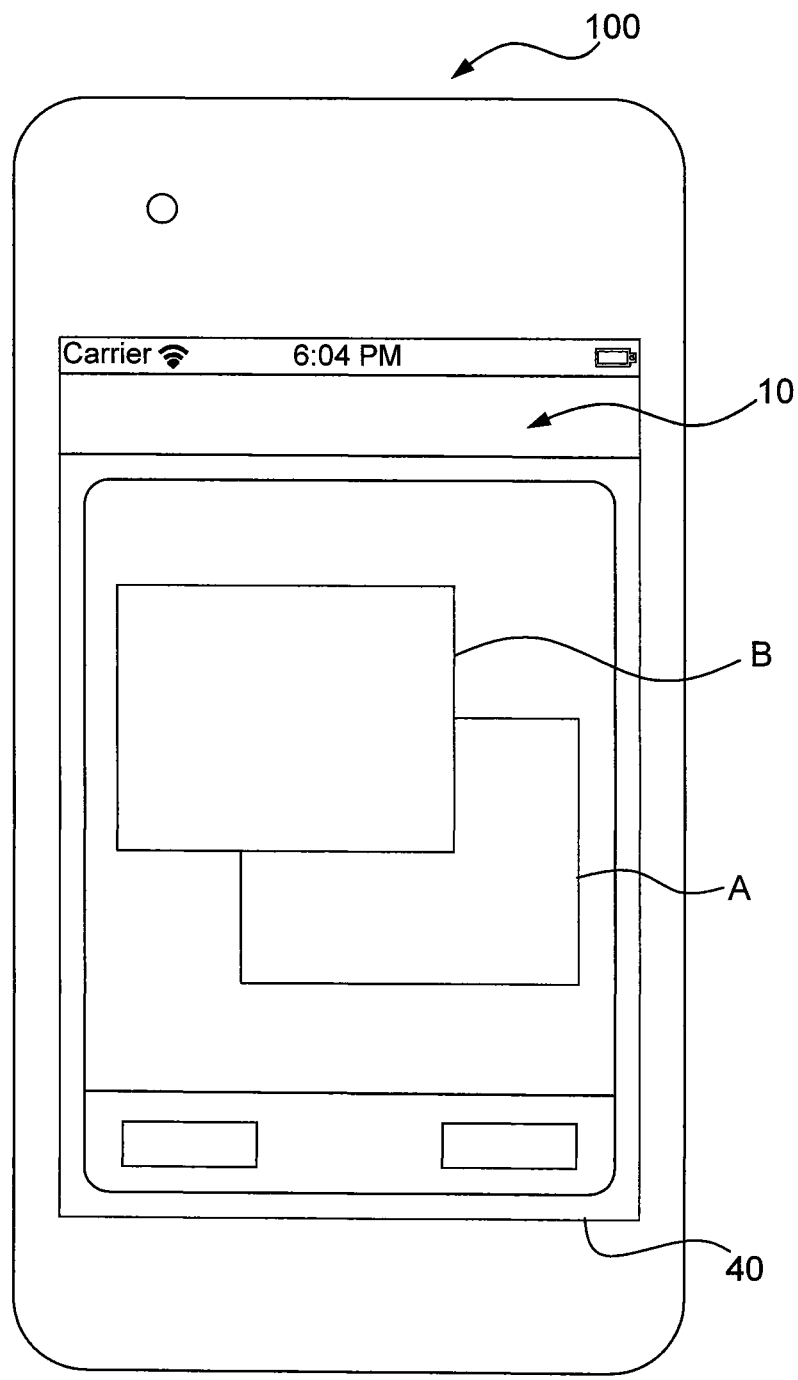
FIG. 1 is a schematic appearance diagram of a mobile device according to an embodiment.

As depicted in FIG. 1, a mobile device 100 of the embodiment includes a touch panel 40 having a display function and an input function. The touch panel 40 may display objects on a screen, for example, in an overlapped manner. In an area in which objects overlap with each other, an object having a highest display order is displayed on the screen. FIG. 1 depicts a screen 10 on which an object A and an object B displayed in a state of partially overlapping with each other, a variety of information, buttons, and the like are displayed. The mobile device 100 is an exemplary information display apparatus.

Figure 2:
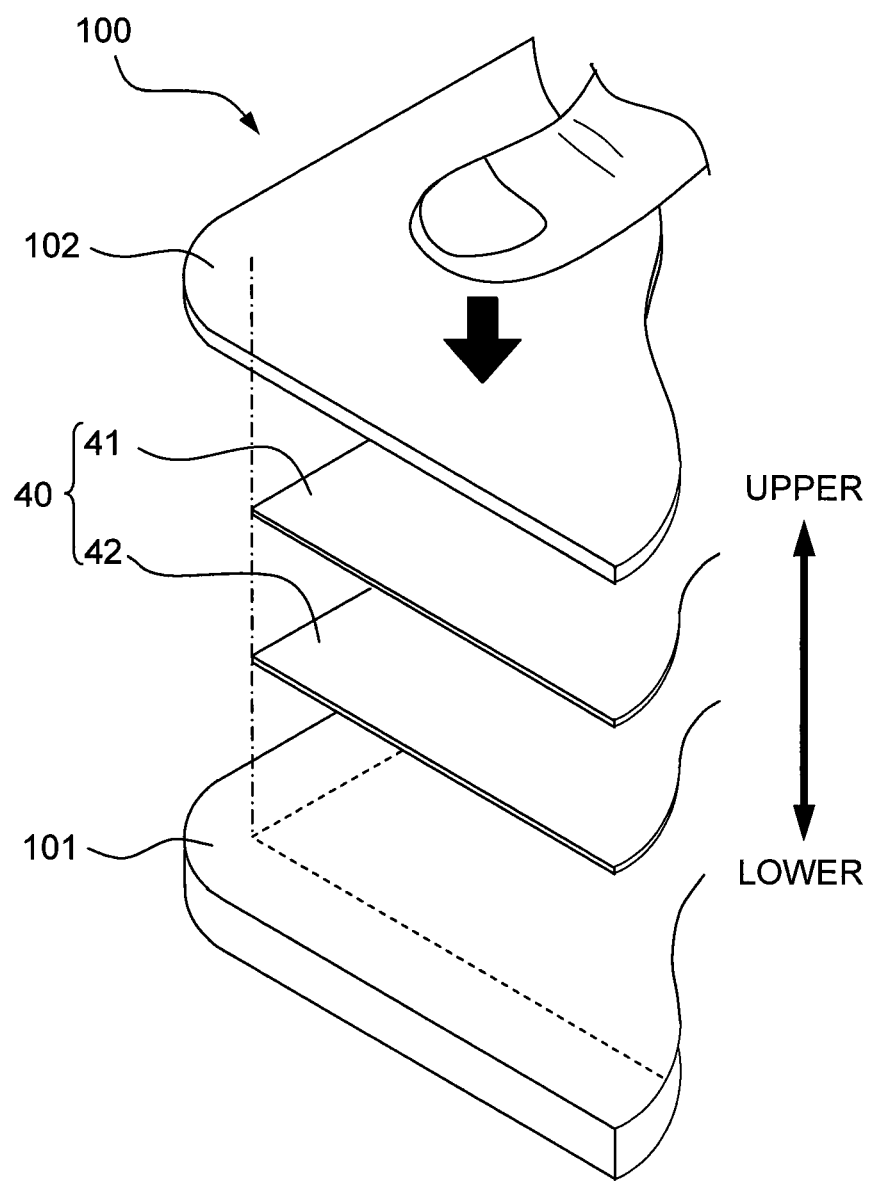
FIG. 2 is an exploded illustrative diagram of a part of the mobile device.

As depicted in FIG. 2, the touch panel 40, which is disposed between a body 101 of the mobile device 100 and a cover glass 102 covering an upper surface of the body 101, includes a liquid crystal display 41 and an input sensor 42. In the following, as indicated by a two-headed arrow in FIG. 2, the side on which the body 101 is disposed is defined as "lower", and the side on which the cover glass 102 is disposed is defined as "upper". The liquid crystal display 41 is an exemplary display and the input sensor 42 is an exemplary detection unit.

The touch panel 40 accepts input that is performed by contact or pressing of a user's finger, a touch pen, or the like with or against the touch panel 40 from above. When accepting the input, the touch panel 40 outputs each signal in response to, for example, a contact position and contact pressure for the accepted input. Each of the user's finger and the touch pen is an exemplary input medium. The input sensor 42 of the touch panel 40 includes a position detection sensor 421 and a pressure detection sensor 422 (see FIG. 3). The position detection sensor 421 of the input sensor 42 outputs each signal in response to an input position based on, for example, capacitance. The pressure detection sensor 422 of the input sensor 42 differentiates or distinguishes at least three pressure ranges of the input operations based on, for example, the change in capacitance corresponding to the degree of deformation of the cover glass 102, and then outputs each signal for the corresponding one of the input pressure ranges. The mobile device 100 detects a coordinate position having accepted the input operation and a pressure range of the input operation based on each output signal of the touch panel 40.

In particular, the mobile device 100 accepts each of the three kinds of input, a tap, peek, and pop which are mutually different in pressure ranges, based on the corresponding output signal from the pressure detection sensor 422 of the input sensor 42 of the touch panel 40. The tap operation includes input that is limited to contact and is made under a light pressure. The tap operation is an example of input under a pressure in a first range. The peek operation is made under a pressure of a degree causing slight deformation of the cover glass 102, and the pressure of the peek operation is stronger than that of the tap operation. The peek operation is an example of input under a pressure in a second range. The pop operation is made under a pressure of a degree causing partial pressing of the cover glass 102, and the pressure of the pop operation is stronger than that of the peek operation. The pop operation is an example of input under a pressure in a third range. Note that, the touch panel 40 may detect such a tap operation caused by a finger contact that may be performed immediately before the touch panel 40 accepts the peek or pop operation.

The mobile device 100 detects a position having accepted the input operation, a movement direction of the input operation, and movement speed of the input operation based on each output signal from the position detection sensor 421 of the input sense 42 of the touch panel 40. Accordingly, the mobile device 100 may accept operations including the drag, flick, and the like.

Figure 3:
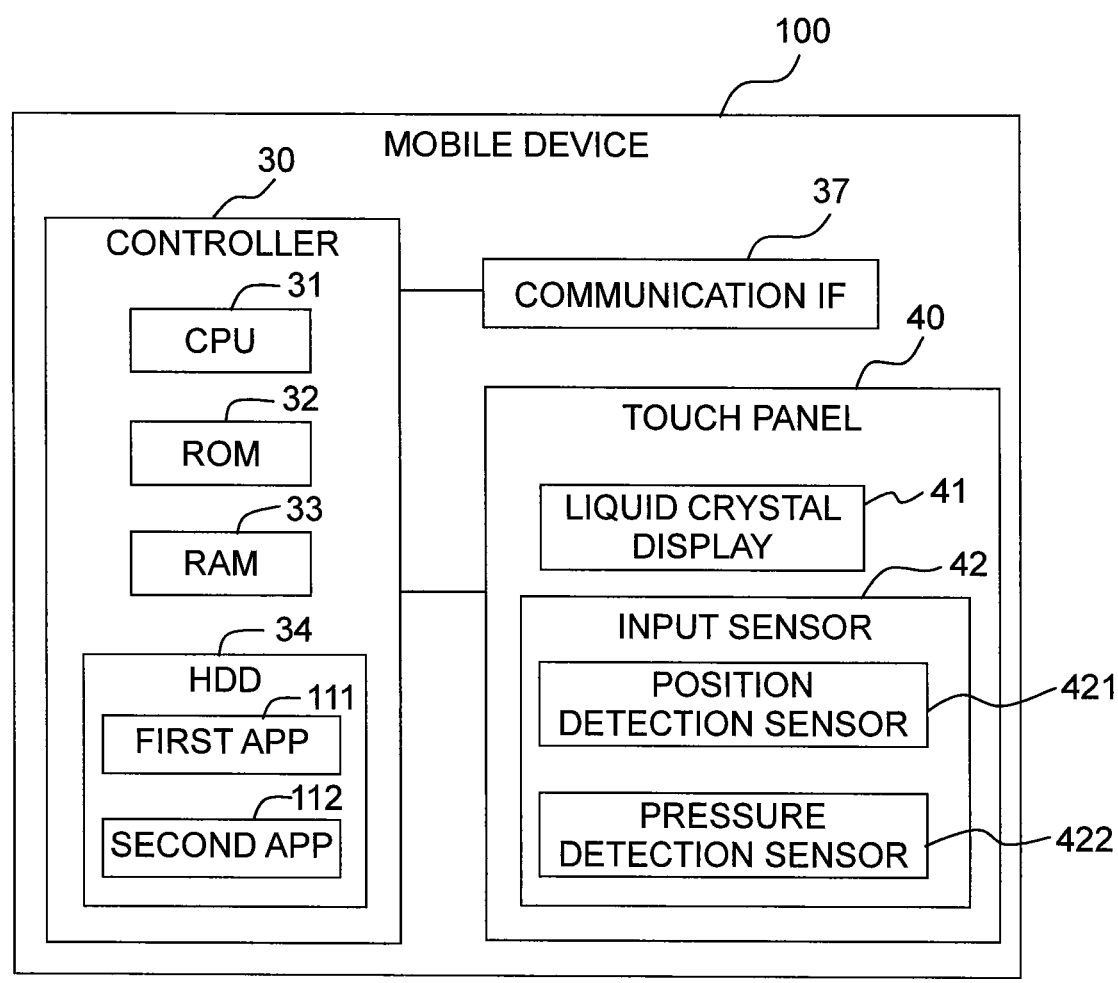
FIG. 3 is a block diagram of an electric configuration of the mobile device.

Subsequently, an electrical configuration of the mobile device 100 of the embodiment will be described. As depicted in FIG. 3, the mobile device 100 includes a controller 30 provided with a CPU 31, a ROM 32, a RAM 33, and a HDD 34. Further, the mobile device 100 includes the touch panel 40 and a communication interface (IF) 37 that enables communication with an external apparatus. The controller 30 controls the IF 37 and the touch panel 40.

The ROM 32 stores various control programs, various settings, initial values, and the like for controlling the mobile device 100. The RAM 33 is used as a working area to which various control programs are loaded, or a storage area in which data are stored temporarily. The HDD 34 stores a browser for browsing files on the Internet, device drivers for controlling various devices, and the like. The HDD 34 of the mobile device 100 according the embodiment further stores a first app 111 and a second app 112 that are application programs for an object display. Each of the first app 111 and the second app 112 is an exemplary program. The CPU 31 controls operations of the first app 111 and the second app 112. Details of the first app 111 and the second app 112 will be described later.

The CPU 31 controls components or parts of the mobile device 100 while storing, in the RAM 33 or the HDD 34, processing results that are obtained in accordance with control programs read from the ROM 32 and/or programs read from the HDD 34. The CPU 31 is an exemplary controller. Or, the controller 30 may be an exemplary controller.

The mobile device 100 executes various application programs in response to user inputs. The first app 111 and the second app 112 are programs that include an operation for displaying an object on the touch panel 40 and execute processing for the displayed object.

When the first app 111 or the second app 122 is executed, the mobile device 100 displays various objects selected by the user on the touch panel 40. When a new object is displayed by the first app 111 or the second app 112, the object that has been already displayed on the touch panel 40 may be present in a display position where the new object is to be displayed. In that case, a part of the new object may be displayed on the already displayed object in an overlapped manner. For example, FIG. 1 depicts an example in which a newly selected object B is displayed on the screen where an object A has been already displayed, and the objects A and B are displayed in a state of partially overlapping with each other. Note that each object may have any shape without being limited to a rectangle.

The mobile device 100 accepts each of the input operations including the user's tap, peek, and pop on the screen 10 where the object has been displayed through execution of the first app 111 or the second app 112. Then, the mobile device 100 changes a display of the screen 10 depending on the accepted input operation. In particular, when objects are displayed on the screen in an overlapped manner, the mobile device 100 changes a display order for the objects.

The display order configuration of the first app 111 after an input operation, such as peek, is accepted is different from the display order configuration of the second app 112 after an input operation, such as peek, is accepted. In particular, the first app 111 does not change a display order for objects but accepts an operation for an object not having the highest display order. In the following, the program enabling such a display mode is referred to as "selection program". Meanwhile, the second app 112 changes a display order for objects. In the following, the program enabling such a display mode is referred to as "movement program".

When the selection program or the movement program is executed, for example, when the tap operation is accepted on the screen 10 in which objects have been displayed in an overlapped manner, the mobile device 100 determines an object having the highest display order as an operation target object. Further, when the peek operation or pop operation is accepted after determination of the operation target object during execution of the selection program or the movement program, the mobile device 100 changes the display order configuration for objects to another configuration depending on the accepted input operation.

The mobile device 100 enables each object displayed on the screen after the change to be subjected to various functions of the first app 111 or the second app 112. The functions that may be performed for each object may be common or different in the first app 111 and the second app 112. The functions of the first app 111 and the second app 112 may be known functions, and thus explanation thereof will be omitted.

Subsequently, the selection program built in the first app 111 will be described with reference to FIGS. 4A to 4C. Executing the selection program causes the mobile device 100 to change the operation target object from among the objects displayed on the screen 10 in response to each user input strength. That is, an object other than the object having the highest display order is determined as the operation target temporally. Namely, in the selection program, when the peek or pop operation is accepted in an area in which objects are displayed in an overlapped manner, an object that is displayed under the object having the highest display order in the area having accepted the input is determined as the operation target object. In this situation, the operation target object may have the highest display order temporarily.

Figure 4A:
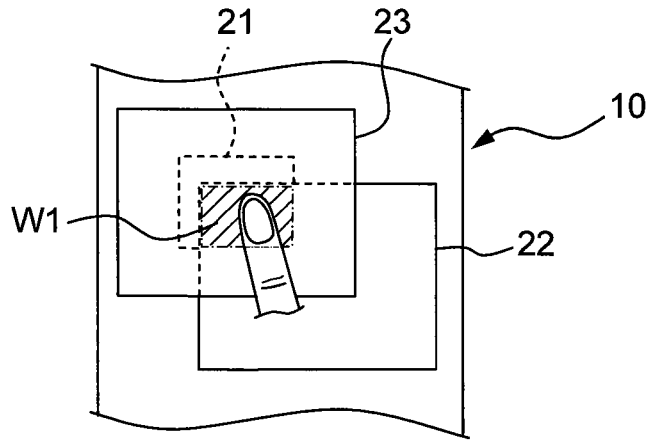
Figure 4A:
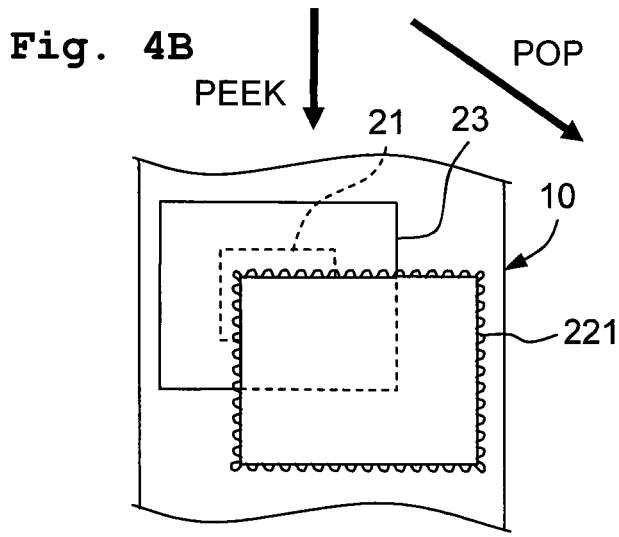
Figure 4A:
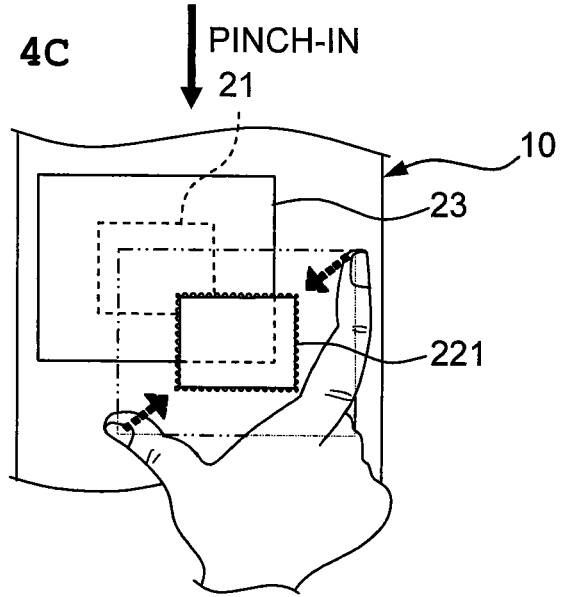
Figure 4A:
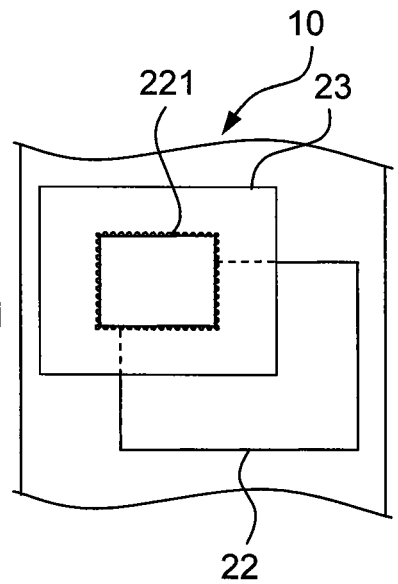

In particular, for example, as depicted in FIG. 4A, an explanation will be made about a case in which, when three objects 21, 22, 23 are displayed in a state of at least partially overlapping with each other, the selection program accepts input to an area W1 where all of the objects 21, 22, 23 overlap with each other. In FIG. 4A, the object 21 is displayed at the bottom, the object 23 is displayed at the top, and the object 22 is displayed at a position between the object 21 and the object 23.

In FIGS. 4A to 4C and diagrams similar to them, regarding object frame lines, each of those displayed at the top is depicted by a solid line, each of those displayed at the second position from the top is depicted by a broken line, and each of those displayed at the third position from the top and a position lower than the third position is not depicted. Namely, although each part that is displayed at the top and depicted by the solid line has a range clearly displayed on the screen 10, any other parts except those displayed at the top are hidden by another object and thus they do not appear on the screen 10. Specifically, the object 21 is smaller than the object 23 and is in a position where the object 21 is completely invisible from the user. The object 22 is in a position where the object 22 is partially hidden by the object 23 and partially appears on the screen 10.

When the selection program accepts the tap operation to the area W1 of the screen 10 of FIG. 4A during execution thereof, the object 23, which is displayed at the top in the area W1, is determined as the operation target object. In general, the operation target object selected by the tap operation is an object displayed at the top. The object that is completely hidden by another object has no part displayed at the top, which make it impossible for the user to select the hidden object through the tap operation. Namely, in order to make the completely hidden object the operation target, at first, the completely hidden object is required to be displayed at the top by, for example, moving the object(s) displayed at position(s) higher than the completely hidden object.

When the selection program accepts the peek operation after accepting the tap operation to the area W1, the display configuration is changed from the screen 10 of FIG. 4A to the screen 10 of FIG. 4B. The screen 10 of FIG. 4B is an exemplary first configuration.

In the screen 10 of FIG. 4B, the mobile device 100 copies the object 22 and displays the copy of the object 22 as a virtual object 221. The object 22 is an object of which display order is lower than that of the object 23 by one. The actual objects 21, 22, and 23 in the screen 10 of FIG. 4B are the same as those of FIG. 4A, and the virtual object 221 is additionally displayed at a position higher than those of the actual objects 21, 22, 23. Namely, a total of four objects are displayed on the screen 10 of FIG. 4B.

The virtual object 221 is determined as a temporary operation target object. The size and position of the virtual object 221 are the same as those of the object 22, and the virtual object 221 is displayed to overlap with the object 22. Thus, the object 22 is positioned below the virtual object 221 and do not appear on the screen 10.

The virtual object 221 is displayed in a form different from that of the object 22 to differentiate the virtual object 221 from the actual object 22. The form of the virtual object 221 is exemplified, for example, by a display different from the object 22 in color or shape of the frame line, a display of which frame line is blurred, a display of which background is transparent, and a blinking display. The virtual object 221 is an example of a display in a special form. Since the virtual object is displayed in such a display form different from that of the actual object, the user may easily realize that the virtual object is the operation target object.

The selection program accepts an editing operation for the virtual object 221. The editing operation includes, for example, movement, rotation, pinch-in, and pinch-out. The selection program edits the virtual object based on the accepted editing operation and then displays an object after editing. When accepting, for example, the pinch-in operation for the virtual object 221, the selection program displays the virtual object 221 in a reduced size, as depicted in FIG. 4C. The selection program repeatedly accepts the editing operation until accepting an end operation for ending the editing for the virtual object 221. The end operation includes, for example, the tap operation on another position and a command for the function of the first app 111.

When accepting the end operation, the selection program deletes the virtual object 221 from the screen 10 and restores the first configuration to the original display order configuration depicted in FIG. 4A. In this situation, the selection program reflects, in the actual object 22, the editing operation for the virtual object 221 that is accepted before the end operation.

When the selection program accepts the pop operation after accepting the tap operation to the area W1 of the screen 10 of FIG. 4A during execution of the selection program, the mobile device 100 copies the object 21 displayed at the bottom and displays the copy of the object 21 as a virtual object 211, as depicted in FIG. 4D. The displayed virtual object 211 is determined as a temporary operation target object. Namely, the virtual object 211 of which content is the same as that of the object 21 displayed at the bottom in FIG. 4A is displayed at the top. Further, the selection program accepts the edit operation for the virtual object 211. The screen 10 of FIG. 4D is an exemplary second configuration.

Figure 5A:
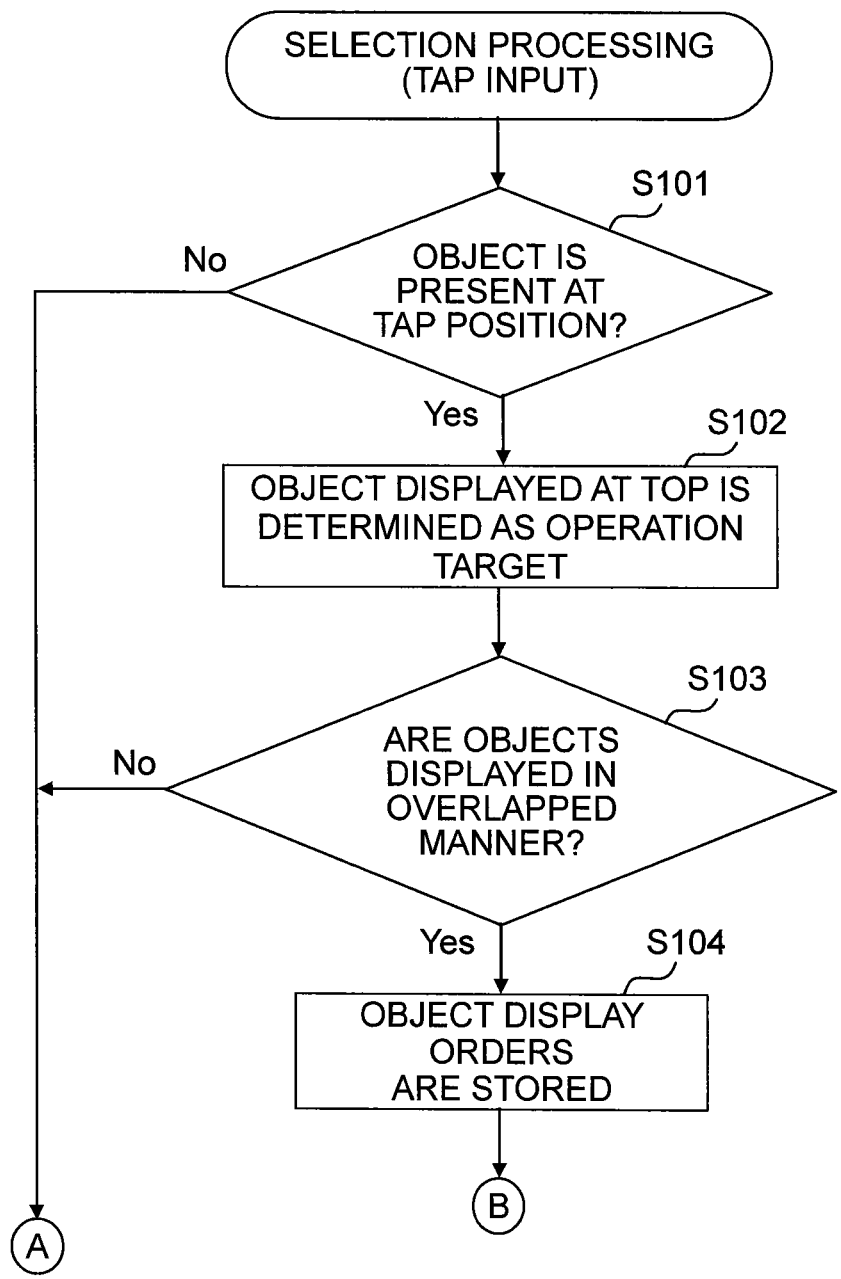
FIGS. 5A to 5C are flowcharts indicating a procedure of selection processing.
Figure 5B:
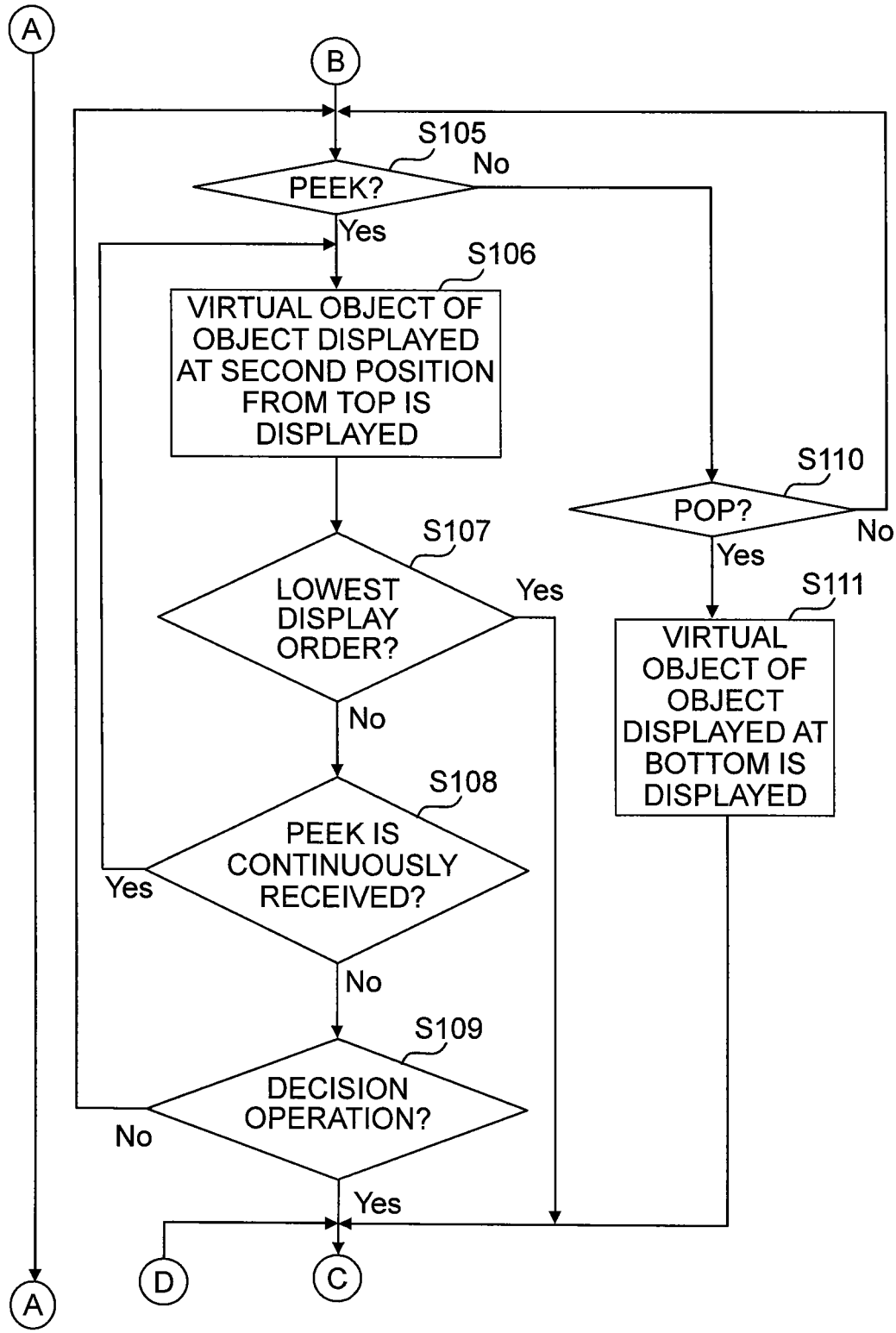
Figure 5C:
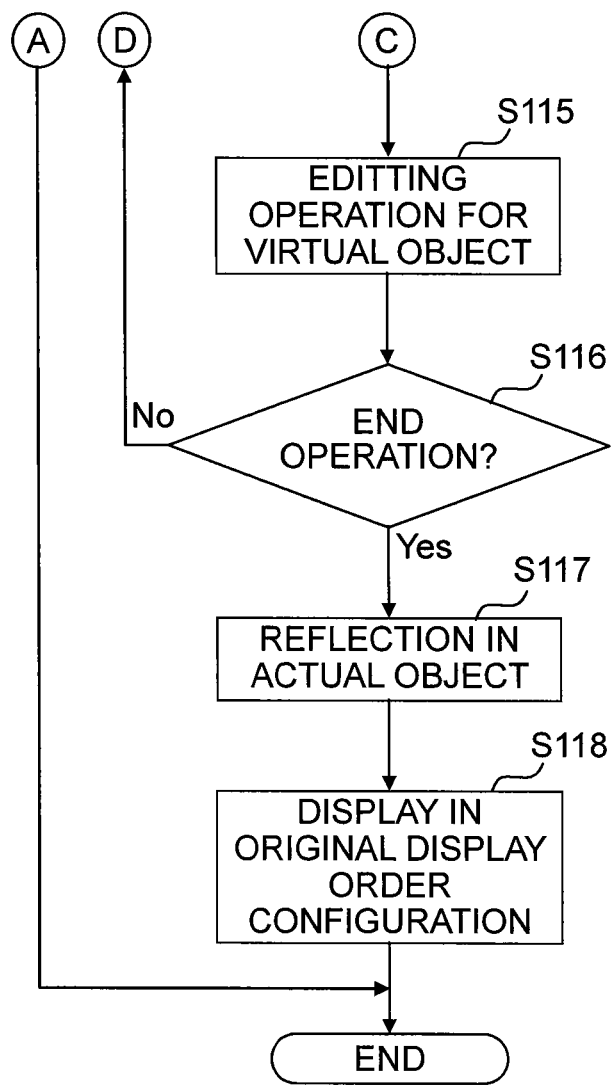

Subsequently, an explanation will be made about a procedure of selection processing for achieving the operation of the selection program that is built in the first app 111 to change the operation target, with reference to the flowchart of FIGS. 5A to 5C. The CPU 31 executes the selection processing when the first app 111 accepts the input operation on the screen.

The mobile device 100 first accepts, as the input operation, the tap operation. Namely, in the first app 111, the peek operation or pop operation is not accepted in a state where the operation target object is not yet determined, and the tap operation is accepted first to determine the operation target. The accepting of the tap operation that starts the selection processing is exemplary first input processing.

In the selection processing, the CPU 31 first determines whether or not an object is displayed in a coordinate position having accepted the tap operation (step S101: hereinafter, the step S101 will be simply referred to as S101 in some cases). When the CPU 31 determines that the object is displayed (S101: YES), the CPU 31 determines an object displayed at the top as an operation target object (S102). A step S102 is exemplary determination processing.

Then, the CPU 31 determines whether or not objects are displayed in an overlapped manner at the position having accepted the tap operation (S103). When the CPU 31 determines that no object is displayed at the position having accepted the tap operation (S101: NO), or when the CPU 31 determines that no objects are displayed in an overlapped manner (S103: NO), the CPU ends the selection processing. Namely, when no objects are displayed in an overlapped manner, the CPU 31 accepts another function of the first app 111 without changing any display order.

When the CPU 31 determines that objects are displayed in an overlapped manner at the position having accepted the tap operation (S103: YES), the CPU 31 determines the objects displayed in the overlapped manner at the position having accepted the tap operation, as display-order change targets, and then stores, in the RAM 33, the display orders and display positions of all of the display-order change targets (S104). The objects determined as the display-order change targets include the object that has been determined as the operation target in the step S102 and an object displayed below the operation target object in a state of overlapping therewith. Each of the objects determined as the display-order change targets may be determined as the operation target object in a subsequent operation.

Then, the CPU 31 determines whether or not it has accepted the peek operation at the position having accepted the tap operation (S105). When the CPU 31 determines that it has accepted the peek operation (S105: YES), the CPU 31 generates a virtual object of the object displayed at the second position from the top from among the objects displayed in the overlapped manner at the position having accepted the tap operation, and displays the virtual object at the top (S106). The accepting of the peek operation is exemplary second input processing, and the step S106 is exemplary first change processing.

In particular, when the CPU 31 accepts the peek operation to the area W1 of the screen 10 of FIG. 4A, the virtual object 221 is displayed at the top as depicted in FIG. 4B. Then, the displayed virtual object 221 is determined as a temporary operation target.

Next, the CPU 31 determines whether or not the displayed virtual object 221 is a virtual object of the object having the lowest display order in the original display order configuration (S107). When the CPU 31 determines that the virtual object 221 is not the virtual object of the object having the lowest display order (S107: NO), the CPU 31 determines whether or not it has been continuously accepting the peek operation for a certain period of time (S108). Namely, when the certain period of time has elapsed in a state where the CPU 31 has been continuously accepting the peek operation at the same position even after displaying the virtual object 221, the determination "YES" is made in the step S108.

When the CPU 31 determines that it has been continuously accepting the peek operation (S108: YES), the CPU 31 determines an object of which display order is lower, by one, than the object corresponding to the virtual object 221 in the original display order configuration, as a temporary operation target object.

For example, when the CPU 31 has been accepting the peek operation further continuously on the screen 10 of FIG. 4B, it deletes the virtual object 221. Then, the CPU 31 generates the virtual object 211 of which content is the same as that of the object 21 having a display order lower than that of the object 22 by one, and displays the virtual object 211 at the top. The screen 10 of FIG. 4D is an example of three objects. Accepting the peek operation continuously changes the object, of which virtual object is displayed as the operation target, sequentially. This allows the user to select a desired object easily.

When the CPU 31 determines that it has not accepted the peek operation continuously (S108: NO), the CPU 31 determines whether or not it has accepted a decision operation for deciding the operation target object (S109). When the CPU 31 determines that it has not accepted the decision operation (S109: NO), the CPU 31 returns to the step S105 to further accept the peek or pop operation.

As described above, when the CPU 31 has been accepting the peek operation continuously during the selection processing, the virtual object displayed on the screen is changed sequentially. Thus, the CPU 31 accepts the decision operation for deciding the currently displayed virtual object, as the virtual object of the operation target. The decision operation includes, for example, an operation in which a finger being used for the peek operation is swayed during the peek operation and an operation in which a finger being used for the peek operation is separated from the touch panel to cancel the peek operation.

For example, the CPU 31 may accept the operation in which the finger being used for the peek operation is swayed during the peek operation, as movement of a coordinate position during the input operation. The user may input the operation in which the finger being used for the peek operation is swayed in succession with the peek operation for changing the displayed virtual object, thus resulting in an easy operation for the user. Meanwhile, the operation in which the finger being used for the peek operation is separated to cancel the peek operation allows the user to image that discontinuation of the peek operation cancels the change of the virtual object.

When the CPU 31 determines that it has not accepted the peek operation at the position having accepted the tap operation (S105: NO), the CPU 31 determines whether or not it has accepted the pop operation (S110). When the CPU 31 determines that it has not accepted the pop operation (S110: NO), the CPU 31 waits until accepting the peek or pop operation. When a waiting state has continued for a predefined time or longer, the CPU 31 may determine that time-out occurs.

When the CPU 31 determines that it has accepted the pop operation at the position having accepted the tap operation (S110: YES), the CPU 31 generates a virtual object of the object displayed at the bottom from among the objects displayed at the position having accepted the tap operation in the overlapped manner, and displays the virtual object at the top (S111). The accepting of the pop operation is exemplary third input processing, and the step S111 is exemplary second change processing.

In particular, when the CPU 11 accepts the pop operation to the area W1 of the screen 10 of FIG. 4A, the virtual object 211 is displayed at the top as depicted in FIG. 4D. Then, the displayed virtual object 211 is determined as a temporary operation target.

Namely, in the selection processing, when accepting the peek operation under a weak pressure, the CPU 31 determines an object of which display order is lower, by one, than that of the object displayed at the top, as the operation target. When accepting the pop operation under a strong pressure, the CPU 31 determines an object displayed at the bottom, that is, an object of which display order is lower, by one or more, than that of the object displayed at the top, as the operation target. This configuration may allow the user to perform the operation easily and intuitively.

When the step S111 has been performed, when the CPU 31 determines that the virtual object of the object having the lowest display order in the original display order configuration has been displayed (S107: YES), or when the CPU 31 determines that it has accepted the decision operation (S109: YES), the CPU 31 determines the virtual object displayed on the screen as an editing operation target, and executes the editing operation (S115). That is, the CPU 31 accepts the editing operation by the user, and changes the display of the virtual object based on the accepted editing operation.

When the CPU 31 has accepted the peek operation continuously and displayed the virtual object of the object having the lowest display order or when the CPU 31 has accepted the pop operation and displayed the virtual object of the object having the lowest display order, the CPU 31 determines the virtual object of the object having the lowest display order as an editing target even without accepting the decision operation.

Then, the CPU 31 determines whether or not it has accepted the end operation for ending the editing (S116). When the CPU 31 determines that it has not accepted the end operation (S116: NO), the CPU 31 further accepts the editing operation until accepting the end operation.

When the CPU 31 determines that it has accepted the end operation (S116: YES), the CPU 31 reflects an editing content accepted through the editing operation in the actual object corresponding to the edited virtual object (S117). Further, the CPU 31 deletes the virtual object, displays the actual object based on the original display order configuration (S118), and then ends the selection processing. Restoring the original display order configuration after the operation for the virtual object as the operation target is completed leads to an easy return to the configuration before the object is edited.

Namely, the selection program accepts input under three kinds of pressure ranges including the tap, peek, and pop operations in a state where objects are displayed in an overlapped manner. When accepting the peek or pop operation, the selection program changes the operation target object displayed at the top. The selection program may perform the editing operation for an object of which display order is not the highest by, for example, displaying the virtual object thereof at the top and using it. Accordingly, the display order configuration for objects may be changed easily, and the user may edit the object easily by changing the operation target object.

Subsequently, the movement program built in the second app 112 will be described with reference to FIG. 6. Executing the movement program causes the mobile device 100 to change the display order of the operation target object from among objects displayed on the screen 10, in response to each user input strength. Namely, when accepting the peek or pop operation in an area where objects are displayed in an overlapped manner, the movement program changes the display order of the operation target object that is displayed at the top in the area having accepted the input.

In particular, for example, as depicted in FIG. 6A, an explanation will be made about a case in which, when three objects 21, 22, 23 are displayed in a state of at least partially overlapping with each other, the movement program accepts input to an area W1 where all of the objects 21, 22, 23 overlap with each other. The display configuration of FIG. 6A is the same as that of FIG. 4A.

When the movement program accepts the tap operation to the area W1 of the screen 10 of FIG. 6A during execution thereof, the object 23 is determined as the operation target object. When the movement program accepts the peek operation after accepting the tap operation to the area W1, the display order of the object 23 is lowed by one, that is, the object 23 has the second highest display order, as depicted in FIG. 6B. In that case, the object 22 having the second highest display order in the original display order configuration is displayed at the top, and the object 21 is displayed under the object 23. Unlike the selection program, the movement program generates no virtual object. The screen 10 of FIG. 6B is an exemplary first configuration.

When the movement program accepts the pop operation after accepting the tap operation to the area W1 of the screen 10 of FIG. 6A during execution thereof, the object 23 is determined to have the lowest display order, as depicted in FIG. 6C. The display orders of the objects 21, 22 are respectively moved up by one. The screen 10 of FIG. 6C is an exemplary second configuration.

Figure 7A:
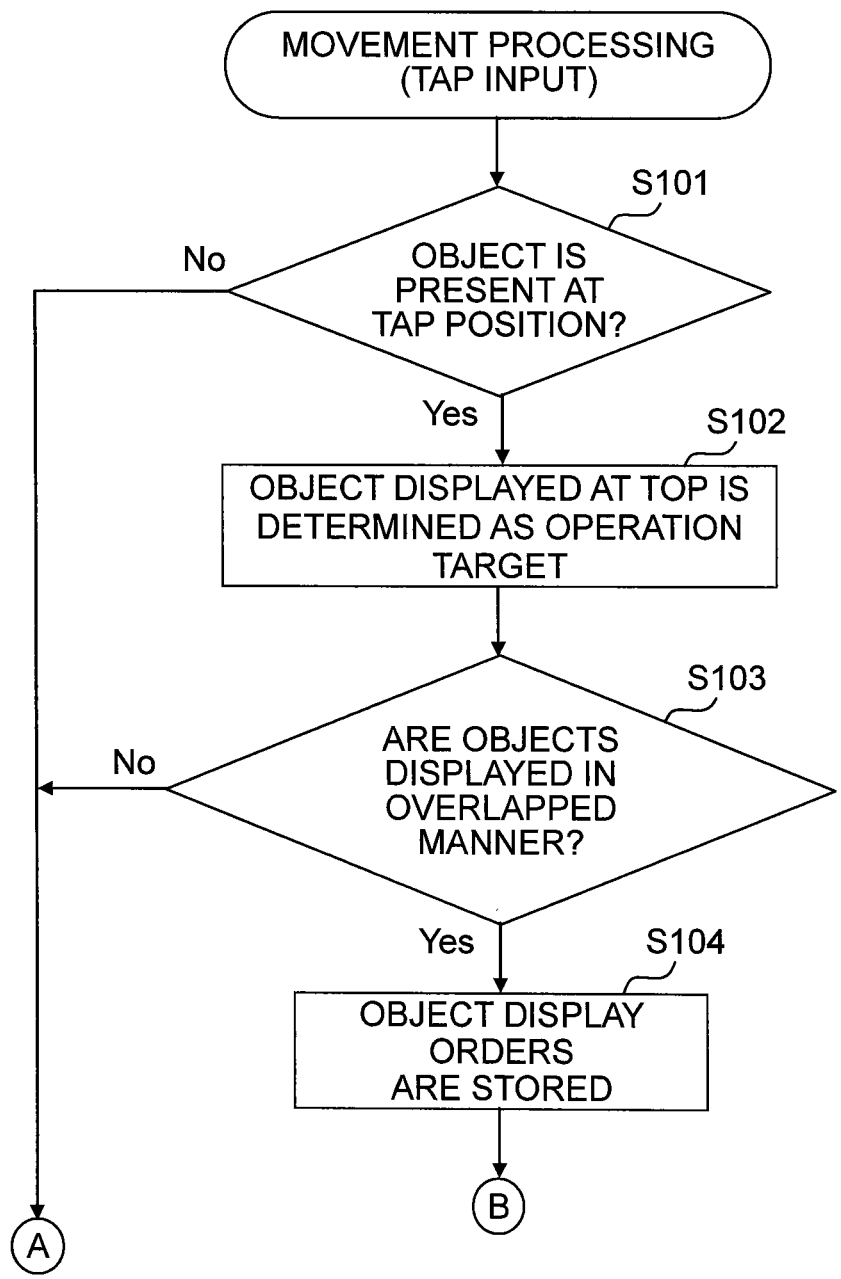
FIGS. 7A and 7B are flowcharts indicating a procedure of movement processing.
Figure 7B:
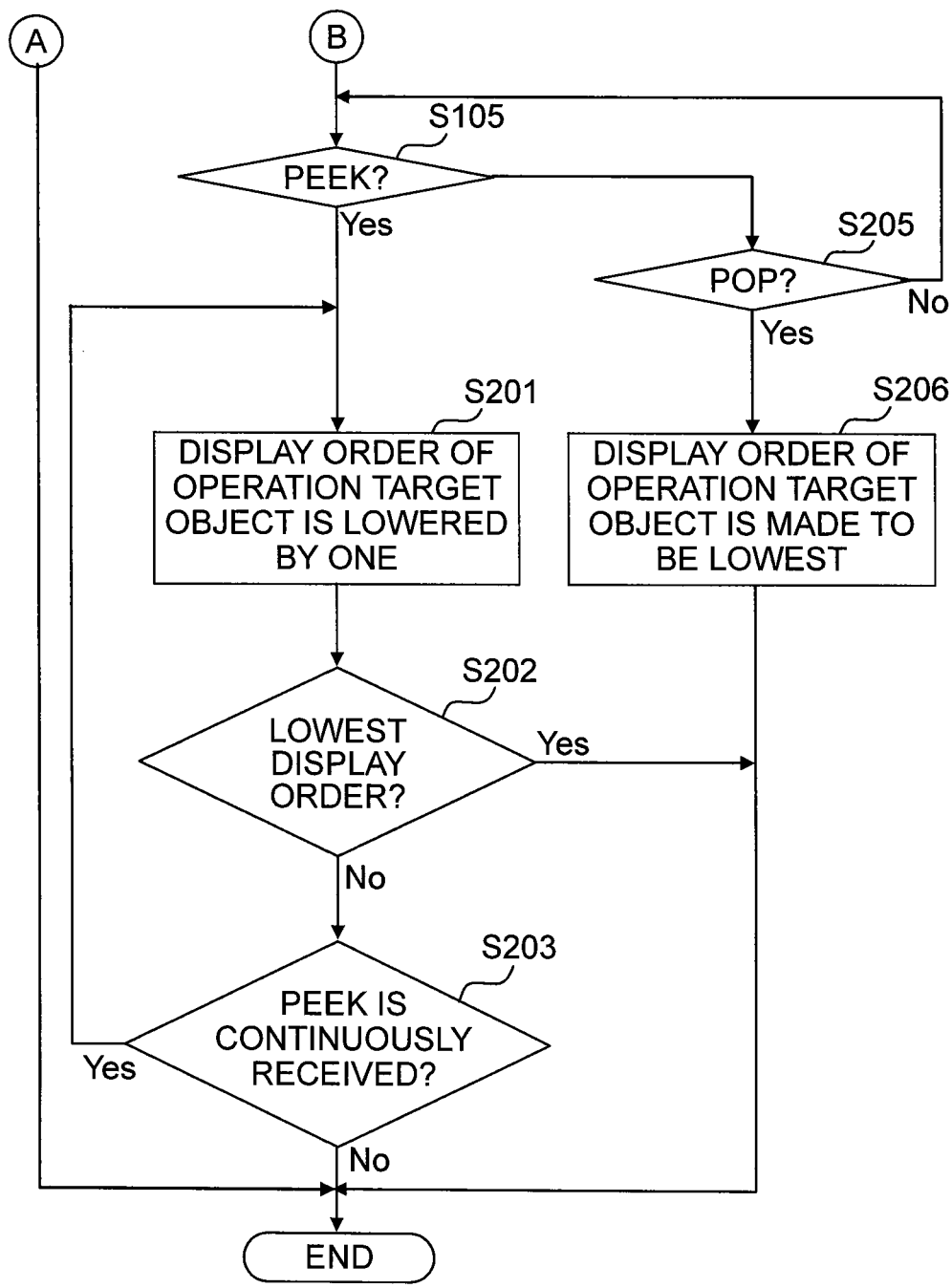

Subsequently, an explanation will be made about a procedure of movement processing for achieving the operation of the movement program that is built in the second app 112 to change the display order, with reference to the flowcharts of FIGS. 7A and 7B. The CPU 31 executes the movement processing when the second app 112 accepts the input operation on the screen. The processing of the movement processing which is the same as or equivalent to the processing of the selection processing is designated by the same reference numeral, any explanation of which will be omitted. The accepting of the tap operation that starts the movement processing is exemplary first input processing.

In the movement processing, the CPU 31 first determines whether or not an object is displayed at a coordinate position having accepted the tap operation (S101). When the CPU 31 determines that the object is displayed (S101: YES), the CPU 31 determines the object displayed at the top as the operation target object (S102). The step S102 is exemplary determination processing.

Then, the CPU 31 determines whether or not objects are displayed in an overlapped manner at the position having accepted the tap operation (S103). When the CPU 31 determines that no object is displayed at the position having accepted the tap operation (S101: NO), or when the CPU determines that no objects are displayed in an overlapped manner (S103: NO), the CPU ends the movement processing.

When the CPU 31 determines that objects are displayed in an overlapped manner at the position having accepted the tap operation (S103: YES), the CPU 31 determines the objects displayed in the overlapped manner at the position having accepted the tap operation, as display-order change targets, and then stores, in the RAM 33, the display orders and display positions of all of the display-order change targets (S104).

Then, the CPU 31 determines whether or not it has accepted the peek operation at the position having accepted the tap operation (S105). When the CPU 31 determines that it has accepted the peek operation (S105: YES), the CPU 31 lowers the display order of the operation target object by one (S201). The accepting of the peek operation is exemplary second input processing, and the step S201 is exemplary first change processing. Accordingly, for example, the operation target object 23 has the second highest display order, as depicted in FIG. 6B.

The CPU 31 determines whether or not the operation target object has the lowest display order by the display order change performed in the step S201 (S202). When the CPU 31 determines that the operation target object does not have the lowest display order (S202: NO), the CPU 31 determines whether or not it has been continuously accepting the peek operation for a certain period of time (S203). When the CPU 31 determines that it has been continuously accepting the peek operation at the same position (S203: YES), the CPU 31 returns to the step S201 to lower the display order of the operation target object by one.

When the CPU 31 determines that it has not accepted the peek operation at the position having accepted the tap operation (S105: NO), the CPU 31 determines whether or not it has accepted the pop operation (S205). When the CPU 31 determines that it has not accepted the pop operation (S205: NO), the CPU 31 waits until accepting the peek or pop operation. When a waiting state has continued for a predefined time or longer, the CPU 31 may determine that time-out occurs.

When the CPU 31 determines that it has accepted the pop operation at the position having accepted the tap operation (S205: YES), the CPU 31 makes the display order of the operation target object 23 the lowest (S206), as depicted in FIG. 6C. The accepting of the pop operation is exemplary third input processing, and the step S206 is exemplary second change processing. When accepting input under a weak pressure, the CPU 31 lowers the display order of the operation target object by one, and when accepting input under a strong pressure, the CPU 31 makes the display order of the operation target object the lowest by lowering the display order of the operation target object by one or more. This configuration may allow the user to perform the operation easily and intuitively.

When the step S206 has been performed, when the CPU 31 determines that the display order of the operation target object is the lowest (S202: YES), or when the CPU 31 determines that it has not accepted the peek operation continuously (S203: NO), the CPU 31 ends the movement processing. The operation target object having the lowest display order can not move any more, in other words, there is no position lower than the bottom where the operation target object having the lowest display order is positioned, and thus the CPU 31 ends the movement processing. The editing operation may be accepted in the movement processing.

That is, the movement processing accepts input under three kinds of pressure ranges including the tap, peek, and pop operations in a state where objects are displayed in an overlapped manner. When accepting the peek or pop operation, the CPU 31 changes the display order of the operation target object displayed at the top. In the movement processing, the operation target object is determined as the display-order change target, which makes it easy for the user to recognize the display order after change. For example, when accepting the peek operation continuously, the display order of the operation target object is sequentially changed. Thus, the user may put the operation target object in a desired display order easily.

In the above-described selection program or movement program, the objects displayed at the position having accepted the tap operation in the step S101 in an overlapped manner are determined as the display-order change targets. Namely, from among the objects displayed on the screen 10, only the objects that are at least partially positioned at the coordinate position having accepted the input are determined as the display-order change targets. Accordingly, the display-order change targets are limited to the objects displayed at the coordinate position having accepted the input in the overlapped manner, thus making it easy for the user to recognize the display-order change targets.

The operation target and the display-order change target, however, are not limited to those described above. For example, from among objects displayed on the screen 10, the object displayed at the top at the coordinate position having accepted the input and all of the objects, of which display areas overlap with at least a part of an area in which the object displayed at the top is displayed, may be determined as the display-order change targets.

Figure 8:
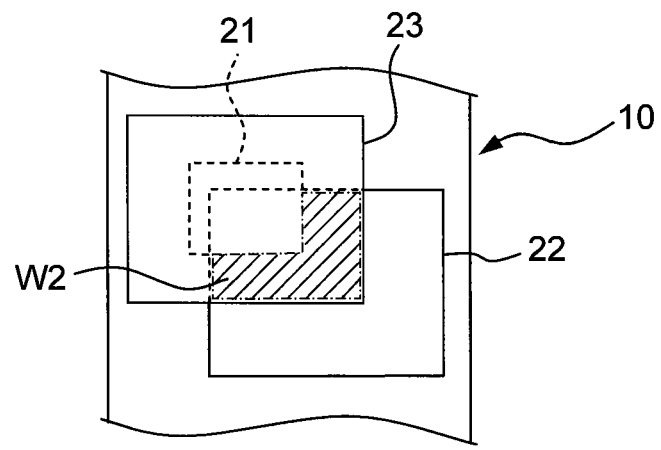
FIG. 8 is an illustration diagram depicting an exemplary relation between an overlap of objects and an input position.

For example, as depicted in FIG. 8, even when the coordinate position having accepted the input is in an area W2 positioned at the outside of the display area of the object 21 in which only the object 22 and the object 23 overlap with each other, the object 21 may be included in the display-order change targets. In that case, the input operation to the area W2 of FIG. 8 is accepted similarly to those depicted in FIGS. 4 and 6 and processing is executed similarly to those depicted in FIGS. 4 and 6.

Namely, all of the object 23 displayed at the top at the coordinate position having accepted the input and the objects displayed in a state of at least partially overlapping with the object 23 may be determined as the display-order change targets. Or, all of the objects each having an area overlapping with the object displayed at the coordinate position having accepted the input may be determined as the display-order change targets.

This configuration allows the completely hidden object 21 to be included in the display-order change targets, for example, even when the user can not recognize the position of the object 21. By allowing the object displayed at the top at the coordinate position having accepted the input and the objects displayed in a state of at least partially overlapping with the object displayed at the top to be determined as the display-order change targets, the user may have many choices for the display-order change targets and a great degree of freedom of the display order change.

When the peek or pop operation is accepted in the area W2 of FIG. 8, the object 21 may not be included in the display-order change targets. In that case, only the object 22 and the object 23 may be the display-order change targets. This configuration reduces the number of display-order change targets, thus allowing the user to find a target object early.

In the selection processing, from among the objects displayed on the screen 10, an object, in which the proportion of an area overlapping with another object to the entire display area itself is greater than a predefined proportion, may be the operation target. The predefined proportion may be ½ or smaller, for example, ¼. Namely, an object in which the proportion of an area hidden by another object is small may not be included in the display-order change targets.

Figure 9:
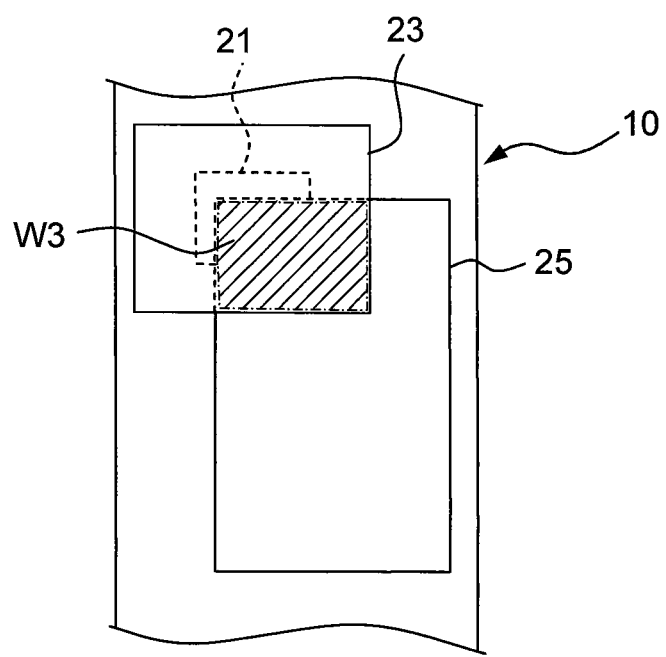
FIG. 9 is an illustration diagram depicting an exemplary relation between an overlap of objects and an input position.

For example, as depicted in FIG. 9, an object 25 displayed in a state of partially overlapping with the objects 21 and 23 has an area W3 overlapping with other objects, and the proportion of the area W3 to the entire area of the object 25 is ¼ or smaller. Thus, the object 25 is not included in the display-order change targets. In that case, the user may see almost all parts of the object 25 without the display order change, and thus there is less need to change the display order.

Accordingly, the number of display-order change targets is reduced by determining the object, in which the proportion of the area overlapping with another object to the entire area is larger than the predefined proportion, as the display-order change target. This configuration allows the user to easily choose the display-order change target. Instead of the determination based on the proportion, determination may be made based on a physical size.

As described above, the mobile device 100 according to the embodiment displays objects on the screen in an overlapped manner and accepts three kinds of input under different pressure ranges. The mobile device 100 includes the first app 111 incorporating the selection program and the second app 112 incorporating the movement program, and executing each of the programs changes a display order configuration for objects to a different configuration depending on the input pressure range. Accordingly, the user may obtain a desired display-order configuration and select a desired object easily. For example, when the user closes the object displayed at the top to select an object other than the object displayed at the top, the user needs to open it when using it again, which is bothersome. In the present teaching, however, the user may change the display order configuration without closing the object displayed at the top, which is user friendly. Further, for example, when the user moves the object displayed at the top to display an object other than the object displayed at the top, the user needs to search it and restore it to the original position when using it again. In the present teaching, however, the user may change the display order configuration without moving the object displayed at the top, which is user friendly. The mobile device 100 of the embodiment may allow the user to easily change the display order configuration for objects.

The embodiment is merely an example and does not limit or restrict the present teaching. Thus, it is a matter of course that the present teaching may be variously improved and modified without departing from the gist of the present teaching. For example, the present teaching is applicable, without being limited to the mobile device, those provided with a function accepting a plurality kinds of input under different pressure ranges and a function displaying objects in an overlapped manner, such as displays of PCs and displays attached to various devices.

The mobile device 100 of the embodiment includes both of the first app 111 incorporating the selection program and the second app 112 incorporating the movement program. The mobile device 100, however, may include any one of the first app 111 and the second app 112.

In the selection program of the embodiment, the virtual object is displayed in the form different from that of the actual object. The present teaching, however, is not limited thereto. For example, the actual object may be displayed at the top temporarily, or the virtual object may be displayed in the form identical to that of the actual object. Alternatively, the actual object may not be displayed in a state where the virtual object is displayed.

In the selection program of the embodiment, when the CPU 31 determines that the virtual object of the object having the lowest display order in the original display order configuration is displayed, the CPU 31 decides the displayed virtual object as the operation target object even in the absence of the decision operation. The present teaching, however, is not limited thereto. Namely, even when the CPU 31 determines that the virtual object of the object having the lowest display order in the original display order configuration is displayed, the CPU 31 may perform decision of the operation target object when accepting the decision operation. When the CPU 31 accepts no decision operation, the CPU 31 may display the virtual object of the object having the highest display order and continue selection of the operation target object.

In the movement program of the embodiment, the display orders and display positions may not be stored. Namely, S103 of the movement processing is not indispensable. Further, the movement program may accept, for example, the editing operation for the object displayed at the top. The editing operation includes, for example, movement, rotation, pinch-in, and pinch-out.

Although the input sensor 42 accepts input under three pressure ranges in the embodiment, the input sensor 42 may accept input under four or more pressure ranges. Further, the input sensor 42 is not limited to that detecting the change in capacitance by use of Force Touch technology, and the input sensor 42 may be a sensor that directly detects a deformation amount of the cover glass 102 or pressure of the accepted input operation and outputs a signal based on the detection result.

The processing disclosed in the embodiment of the present teaching may be performed by a single CPU, a plurality of CPUs, hardware such as ASIC, or a combination thereof. The processing disclosed in the embodiment of the present teaching may be achieved by a recording medium storing a program for executing the processing, or by various forms or modes such as methods.

What is claimed is:

1. A non-transitory recording medium storing a program which is to be executed on an information display apparatus including a screen having an input function,
wherein the program causes the information display apparatus to execute:
displaying a plurality of objects on the screen;

accepting input under a pressure in a first range on the screen;

accepting input under a pressure in a second range stronger than the pressure in the first range on the screen;

determining as to whether at least one of the plurality of objects is located at an input position at which the pressure in at least one of the first range and the second range has been input, wherein the input position is an initial tap position;

determining, from among the at least one of the plurality of objects located at the input position, a first object displayed at a top at the input position as an operation target object, in a case that the at least one of the plurality of objects is located at the input position; and determining as to whether the plurality of objects is overlapped at the input position, wherein in a case that it is determined that the plurality of objects is overlapped at the input position, the program causes the information display apparatus to execute:

obtaining a display order configuration for the plurality of objects overlapped at the input position as a first display order configuration;

changing the first display order configuration for the plurality of objects to a second display order configuration in a case that the input under the pressure in the second range is accepted at the input position on the screen, the second display order configuration having a second object displayed at the top at the input position; and changing the operation target object from the first object to the second object, wherein in a case that it is determined that the plurality of objects is not overlapped at the input position, the program causes the information display apparatus not to execute changing the first display order configuration for the plurality of objects to the second display order configuration, and wherein, in the case that the program causes the information display apparatus to execute changing the display order configuration for the objects to the second configuration and in the case that the program causes the information display apparatus to execute changing the display order configuration for the objects to the second configuration different from the first configuration, the program causes the information display apparatus to execute determining, from among the objects displayed on the screen, an object in which a proportion of an area overlapping with another object to an entire display area itself is greater than a predefined proportion, as a display-order change target.

2. The recording medium storing the program according to claim 1, wherein the program causes the information display apparatus to execute:

accepting input under a pressure in a third range stronger than the pressure in the second range on the screen; and changing the display order configuration for the objects to a third configuration different from the first configuration and the second configuration, in a case that the input under the pressure in the third range is accepted on the screen after the determination of the operation target object.

3. The recording medium storing the program according to claim 2, wherein, in the case that the program causes the information display apparatus to execute changing the display order configuration for the objects to the second configuration and in the case that the program causes the information display apparatus to execute changing the display order configuration for the object to the second configuration different from the first configuration, the program causes the information display apparatus to execute changing the display order of the operation target object.

4. The recording medium storing the program according to claim 3, wherein, in the second configuration, the display order of the operation target object is lowered by one.

5. The recording medium storing the program according to claim 4, wherein, in a case that the input under the pressure in the first range is continued after the display order configuration for the objects is changed to the second configuration, the display order of the operation target object is lowered by one at regular time intervals.

6. The recording medium storing the program according to claim 3, wherein, in the second configuration, the operation target object has a lowest display order.

7. The recording medium storing the program according to claim 2, wherein, in the case that the program causes the information display apparatus to execute changing the display order configuration for the objects to the second configuration and in the case that the program causes the information display apparatus to execute changing the display order configuration for the objects to the second configuration different from the first configuration, the program causes the information display apparatus to execute determining, from among the objects displayed on the screen, an object which is positioned at a coordinate position having accepted the input, as a display-order change target.

8. The recording medium storing the program according to claim 2, wherein, in the case that the program causes the information display apparatus to execute changing the display order configuration for the objects to the second configuration and in the case that the program causes the information display apparatus to execute changing the display order configuration for the objects to the second configuration different from the first configuration, the program causes the information display apparatus to execute determining, from among the objects displayed on the screen, an object having a highest display order at a coordinate position having accepted the input and an object of which display area at least partially overlaps with an area in which the object having the highest display order is displayed, as display-order change targets.

9. The recording medium storing the program according to claim 1, wherein, in the first configuration, from among the objects, an object of which display order is lower than that of a current operation target object by one is determined as the operation target object.

10. The recording medium storing the program according to claim 9, wherein, in the case that the program causes the information display apparatus to execute changing the display order configuration for the objects to the second configuration, the program causes the information display apparatus to execute storing a display order configuration before being changed to the second configuration;

in a case that the input under the pressure in the first range is continued after the display order configuration is changed to the second configuration, the display order of the current operation target object returns to a display order before being changed to the second configuration at regular time intervals; and an object of which display order is lower, by one, than the object of which display order has returned to the display order before being changed to the second configuration is determined as the operation target object.

11. The recording medium storing the program according to claim 1, wherein, in the second configuration, from among the objects, an object having a lowest display order is determined as the operation target object.

12. The recording medium storing the program according to claim 1,
wherein, in the case that the program causes the information display apparatus to execute changing the display order configuration for the objects to the second configuration, the program causes the information display apparatus to execute:
storing a display order configuration before being changed to the second configuration;
displaying an object which is determined as the operation target object by changing the display order configuration for the objects to the second configuration, in a special form which is different from a display form before determining the object as the operation target object; and
accepting an editing operation to edit the operation target object and an end operation to end the operation on the operation target object in a state where the operation target object in the special form is displayed, and
in a case that the end operation is accepted, the program causes the information display apparatus to execute restoring the special form of the operation target object to the display form before determining the object as the operation target object and restoring the second configuration to the display order configuration before being changed to the second configuration.

13. The recording medium storing the program according to claim 12, wherein the program causes the information display apparatus to execute accepting a decision operation to decide the operation target object in a state where the operation target object in the special form is displayed.

14. The recording medium storing the program according to claim 13, wherein an operation, in which the input is performed to move a coordinate position thereof while the input is being continuously preformed on the screen having the display of the operation target object in the special form, is determined as the decision operation.

15. The recording medium storing the program according to claim 1,
wherein in the case that the program causes the information display apparatus to execute changing the display order configuration for the objects to the second configuration different from the second configuration, the program caused the information display apparatus to execute:
storing a display order configuration before being changed to the second configuration;
displaying an object which is determined as the operation target object by changing the display order configuration for the objects to the second configuration, in a special form which is different from a display form before determining the object as the operation target object;
accepting an editing operation to edit the operation target object and an end operation to end the operation on the operation target object in a state where the operation target object in the special form is displayed, and in a case that the end operation is accepted, the program causes the information display apparatus to execute restoring the special form of the operation target object to the display form before determining the object as the operation target object and restoring the second configuration to the display order configuration before being changed to the second configuration.

16. The recording medium storing the program according to claim 1,
wherein the second configuration includes a copy of the second object having the highest display order; and
wherein the operation target is changed to the copy of the second object after the display order has been changed to the second configuration.

17. An information display apparatus, comprising:
a display having a screen on which an object is to be displayed;
a detection unit configured to output different signals depending on different kinds of contact pressure of an input medium on the screen; and
a controller configured to:
detect input under a pressure in a first range on the screen based on one signal of the different signals output from the detection unit;
detect input under a pressure in a second range stronger than the pressure in the first range on the screen, based on another signal of the different signals output from the detection unit;
determine as to whether at least one of the plurality of objects is located at an input position at which the pressure in at least one of the first range and the second range has been input, wherein the input position is an initial tap position;
determine from among the at least one of the plurality objects located at the input position, a first object displayed at a top at the input position as an operation target object, in a case that the at least one of the plurality of objects is located at the input position; and
determine as to whether the plurality of objects is overlapped at the input position,
wherein in a case that it is determined that the plurality of objects is overlapped at the input position, the program causes the information display apparatus to execute:
obtain a display order configuration for the plurality of objects overlapped at the input position as a first display order configuration;
change the first display order configuration for the objects to a second display order configuration, in a case that the input under the pressure in the second range is accepted at the input position on the screen, the second display order configuration having a second object displayed at the top at the input position; and
change the operation target object from the first object to the second object,
wherein in a case that it is determined that the plurality of objects is not overlapped at the input position, the program causes the information display apparatus not to execute changing the first display order configuration for the plurality of objects to the second display order configuration, and
wherein, in the case that the program causes the information display apparatus to execute changing the display order configuration for the objects to the second configuration and in the case that the program causes the information display apparatus to execute changing the display order configuration for the objects to the second configuration different from the first configuration, the program causes the information display apparatus to execute determining, from among the objects displayed on the screen, an object in which a proportion of an area overlapping with another object to an entire display area itself is greater than a predefined proportion, as a display-order change target.

18. The information display apparatus according to claim 17,
wherein the controller is further configured to
detect input under a pressure in a third range stronger than the pressure in the second range on the screen, based on still another signal of the different signals output from the detection unit; and
change the display order configuration for the objects to a third configuration different from the first configuration and the second configuration, in a case that the input under the pressure in the third range is accepted on the screen after the determination of the operation target object.

19. A non-transitory recording medium storing a program which is to be executed on an information display apparatus including a screen having an input function,
wherein the program causes the information display apparatus to execute:
displaying a plurality of objects in a predefined position on the screen in an overlapped display order configuration of a first configuration, the first configuration including a first object having a highest display order and a second object having a display order lower than the first object;
accepting input under a pressure in a first range on the screen;
accepting input under a pressure in a second range stronger than the pressure in the first range on the screen;
determining, from among the objects displayed in the predefined position on the screen in the first configuration, the first object having a highest display order of the first configuration as an operation target object, in a case that the input under the pressure in the first range is accepted in the predefined position;
changing the display order configuration for the objects to a second configuration in a case that the input under the pressure in the second range is accepted on the screen after the determination of the first object as the operation target object, while maintaining respective locations on the screen of the plurality of objects, the second configuration being formed by a temporary copy the second object having the highest display order; and
changing the operation target to the second object after the display order has been changed to the second configuration,
wherein, in the case that the program causes the information display apparatus to execute changing the display order configuration for the objects to the second configuration and in the case that the program causes the information display apparatus to execute changing the display order configuration for the objects to the second configuration different from the first configuration, the program causes the information display apparatus to execute determining, from among the objects displayed on the screen, an object in which a proportion of an area overlapping with another object to an entire display area itself is greater than a predefined proportion, as a display-order change target.

* * * * *